April 4, 1944.  G. W. HAMEL  2,345,970
SEAT
Filed Jan. 5, 1942

Witness:
Geo. L. Chapel

Inventor
George W. Hamel
By Rice and Rice
Attorneys

Patented Apr. 4, 1944

2,345,970

UNITED STATES PATENT OFFICE 2,345,970

SEAT

George W. Hamel, Grand Rapids, Mich.

Application January 5, 1942, Serial No. 425,581

7 Claims. (Cl. 155—5.13)

The present invention relates to seats and more particularly to an auxiliary bicycle seat.

The primary objects of the instant invention are to provide a seat of the general character above indicated which is especially well adapted for use for transporting a child when secured to the frame of a bicycle; to provide such a seat which may be readily and conveniently secured to or removed from the pair of vertically spaced longitudinal parallel bars of the frame of the bicycle and immediately rearwardly of the handle bars thereof; to provide such a seat which is safe when in use; to provide such a seat which is simple yet sturdy in construction; to provide such a seat which is vertically adjustable as to its height above the bicycle frame; and, to provide such a seat which is economical in manufacture.

An illustrative embodiment of the invention is shown in the accompanying drawing, wherein.

Figures 1, 2:
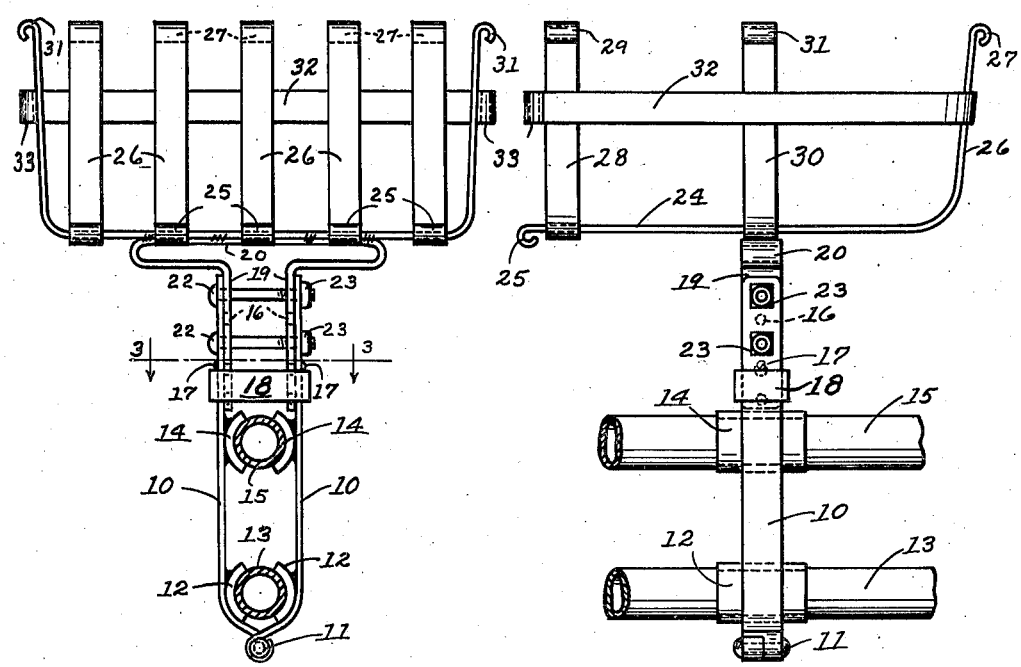
Figure 1 is a front elevational view of the seat and its associated parts showing the manner in which it is detachably secured to the frame of the bicycle.
Figure 2 is a side elevational view thereof.

Referring then to the drawing wherein like parts of the seat, its spring support, bicycle frame clamp and portions of the bicycle frame are each designated by the same numerals in the several views, the bicycle frame clamp is a U-shaped member whose oppositely disposed arms 10 are pivotally connected by a pintle 11.

The lower end of each arm 10 is provided with an inwardly facing arcuate portion 12, each adapted to embrace an opposite side of the lower bar 13 of the bicycle frame and the medial portion of each arm 10 is likewise provided with an inwardly facing arcuate portion 14, each adapted to embrace an opposite side of the upper bar 15 of the bicycle frame, all as best shown in Figures 1 and 2. The upper end of each arm 10 of the U-shaped clamp is further provided with a plurality of oppositely aligned vertically spaced bolt receiving apertures 16 and the outer surface of each arm is likewise provided with an indented collar retaining button 17.

Figure 3:
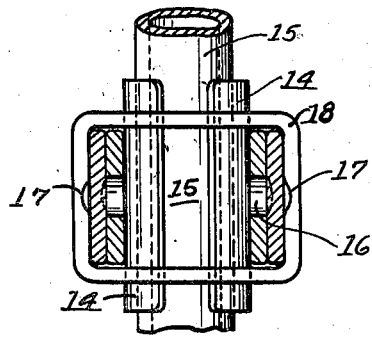
Figure 3 is an enlarged sectional view on line 3—3 of Figure 1.
Figure 4:
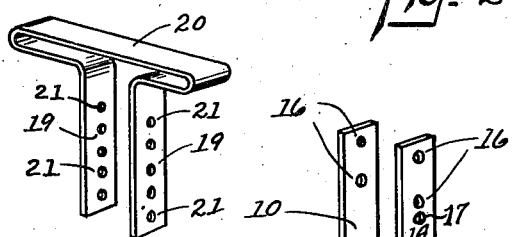
Figure 4 is a perspective view of the vertically adjustable spring support on which the seat is mounted.
Figure 5:
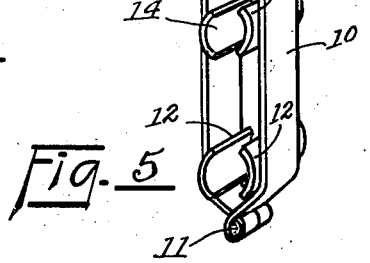
Figure 5 is a perspective view of the bicycle frame clamp to which the spring seat support may be vertically adjustably secured.

The U-shaped clamp is secured to the frame of the bicycle by folding its two arms 10 toward each other in a manner whereby the oppositely disposed arcuate portions 12, 14 respectively embrace the lower and upper bars 13, 15 of the bicycle frame after which the rectangular collar 18 is slipped over the upper ends of the arms 10 and slid downwardly below the oppositely disposed collar retaining buttons 17, as best shown in Figures 1-3.

The oppositely disposed depending arms 19 of the generally inverted U-shaped seat support 20, preferably of springable strap metal, are provided with a plurality of oppositely aligned vertically spaced bolt receiving apertures 21 adapted to selectively register with oppositely aligned bolt receiving apertures 16 in the arms 10 of the frame clamp and bolts 22 are passed through the registering apertures 16, 21 and secured by nuts 23 to vertically adjust the seat support 20 relatively to the frame clamp of the bicycle immediately rearwardly of the handle bars.

The seat per se comprises a plurality of spaced horizontal forwardly-rearwardly disposed strap metal members 24 whose forward ends 25 are preferably curled downwardly and whose rearward portions 26 are bent upwardly and the ends 27 of whose upwardly bent portions are preferably likewise curled downwardly, all as best shown in Figure 2.

A U-shaped member 28, likewise here shown as of strap metal and whose opposite ends 29 are curled downwardly as shown, is disposed transversely and below the forwardly-rearwardly disposed strap metal members 24 adjacent their forward ends and to which it is secured as by spot welding and a second U-shaped member 30, likewise preferably of strap metal and whose opposite ends 31 are curled downwardly, is disposed transversely and below the forwardly-rearwardly disposed strap metal members 24 medially of their horizontal lengths to which it is similarly secured and also to the seat support 20 as by spot welding.

Another U-shaped member 32 of strap metal is spot welded to the members 28, 30 and 26 medially of their height to likewise form a portion of the seat and its ends 33 are curled outwardly.

It will thus be seen that the auxiliary bicycle seat herein shown and described may be readily and conveniently secured to or removed from the frame of a bicycle, that the seat is safe when in use, is simple yet rugged in construction, is vertically adjustable and may be economically manufactured.

While but one specific embodiment of the invention has been herein shown and described, it will be understood that certain details of the construction shown may be altered or omitted without departing from the spirit of the invention as the same is defined by the following claims.

I claim:

1. An auxiliary bicycle seat construction adapted to be detachably secured to the longitudinally parallel and vertically spaced bars of a bicycle frame comprising a U-shaped member whose oppositely disposed arms are provided with upper jaws adapted to embrace opposite sides of the upper bar and are provided with lower jaws adapted to embrace opposite sides of the lower bar, a collar downwardly slidable over the upper ends of said arms of the U-shaped member to effect a clamping engagement of said jaws with said bars, and a seat detachably secured to the upper ends of said arms.

2. An auxiliary bicycle seat construction adapted to be detachably secured to the longitudinally parallel and vertically spaced bars of a bicycle frame comprising a U-shaped member whose oppositely disposed arms are provided with upper jaws adapted to embrace opposite sides of the upper bar and are provided with lower jaws adapted to embrace opposite sides of the lower bar, a collar downwardly slidable over the upper ends of said arms of the U-shaped member to effect a clamping engagement of said jaws with said bars, and a seat detachably secured to and vertically adjustable on the upper ends of said arms.

3. An auxiliary bicycle seat construction adapted to be detachably secured to the longitudinally parallel and vertically spaced bars of a bicycle frame comprising a U-shaped member whose oppositely disposed arms are provided with upper jaws adapted to embrace opposite sides of the upper bar and are provided with lower jaws adapted to embrace opposite sides of the lower bar, a collar downwardly slidable over the upper ends of said arms of the U-shaped member to effect a clamping engagement of said jaws with said bars, a springable seat support comprising an inverted generally U-shaped member having outwardly bowed portions at the upper ends of said arms detachably secured to the upper ends of said arms, and a seat mounted on said support.

4. An auxiliary bicycle seat construction adapted to be detachably secured to the longitudinally parallel and vertically spaced bars of a bicycle frame comprising a U-shaped member whose oppositely disposed arms are provided with upper jaws adapted to embrace opposite sides of the upper bar and are provided with lower jaws adapted to embrace opposite sides of the lower bar, a collar downwardly slidable over the upper ends of said arms of the U-shaped member to effect a clamping engagement of said jaws with said bars, a springable seat support comprising an inverted generally U-shaped member having outwardly bowed portions at the upper ends of said arms vertically adjustably secured to the upper ends of said arms, and a seat mounted on said support.

5. An auxiliary bicycle seat construction adapted to be detachably secured to the longitudinally parallel and vertically spaced bars of a bicycle frame comprising a U-shaped member whose oppositely disposed arms are pivotally secured together and are provided with upper jaws adapted to embrace opposite sides of the upper bar and are provided with lower jaws adapted to embrace opposite sides of the lower bar, a collar downwardly slidable over the upper ends of said arms of the U-shaped member to effect a clamping engagement of said jaws with said bars, and a seat detachably secured to the upper ends of said arms.

6. An auxiliary bicycle seat construction adapted to be detachably secured to the longitudinally parallel and vertically spaced bars of a bicycle frame comprising a U-shaped member whose oppositely disposed arms are provided with upper jaws adapted to embrace opposite sides of the upper bar and are provided with lower jaws adapted to embrace opposite sides of the lower bar, a collar downwardly slidable over the upper ends of said arms of the U-shaped member to effect a clamping engagement of said jaws with said bars, a springable seat support comprising an inverted generally U-shaped member having outwardly bowed portions at the upper ends of said arms, detachably secured to the upper ends of said arms, and a seat mounted on said support comprising a plurality of horizontally spaced strap metal members whose rearward ends are turned upwardly to form a back, a pair of spaced transversely disposed U-shaped strap metal members secured to the horizontally spaced strap members, and a U-shaped strap metal member secured to the back strap members and to the arms of the U-shaped members above the horizontally spaced strap members.

7. An auxiliary bicycle seat construction adapted to be detachably secured to the longitudinally parallel and vertically spaced bars of a bicycle frame comprising a U-shaped member whose oppositely disposed arms are provided with upper jaws adapted to embrace opposite sides of the upper bar and are provided with lower jaws adapted to embrace opposite sides of the lower bar, a collar downwardly slidable over the upper ends of said arms of the U-shaped member to effect a clamping engagement of said jaws with said bars, a springable seat support comprising an inverted generally U-shaped member having outwardly bowed portions at the upper ends of said arms detachably secured to the upper ends of said arms, and a seat mounted on said support comprising a plurality of horizontally spaced strap metal members whose rearward ends are turned upwardly to form a back, a pair of spaced transversely disposed U-shaped strap metal members secured to the horizontally spaced strap members, and a U-shaped metal member secured to the back strap members and to the arms of the U-shaped members above the horizontally spaced strap members, the ends of all of said strap metal members being curled.

GEORGE W. HAMEL.